(12) United States Patent
Neeb et al.

(10) Patent No.: US 7,632,061 B2
(45) Date of Patent: Dec. 15, 2009

(54) PUMP OR TURBINE DRIVE UNIT COMPRISING SUCH A PUMP OR TURBINE AND OUTBOARD MOTOR

(75) Inventors: Taco Wijnand Neeb, Nederhorst den Berg (NL); Johann Hennig Schreuder, Tjerkgaast (NL)

(73) Assignee: Tendris Solutions B.V., Naarden (NL)

( * ) Notice: Subject to any disclaimer, the term of this patent is extended or adjusted under 35 U.S.C. 154(b) by 289 days.

(21) Appl. No.: 11/212,193

(22) Filed: Aug. 26, 2005

(65) Prior Publication Data

US 2006/0078436 A1    Apr. 13, 2006

Related U.S. Application Data

(63) Continuation of application No. PCT/NL2004/000140, filed on Feb. 25, 2004.

(51) Int. Cl.
*F04D 27/00*    (2006.01)
(52) U.S. Cl. .............. 415/60; 415/90; 415/144; 415/211.2; 440/39; 440/47
(58) Field of Classification Search .............. 415/58.4, 415/58.5, 60–61, 66, 90, 116, 144–145, 206, 415/211.2; 440/39–40, 47
See application file for complete search history.

(56) References Cited

U.S. PATENT DOCUMENTS

| | | | | |
|---|---|---|---|---|
| 1,061,142 A | * | 5/1913 | Tesla ........................ | 415/90 |
| 1,262,240 A | * | 4/1918 | Okun ........................ | 415/116 |
| 3,017,848 A | * | 1/1962 | Bishop ..................... | 415/60 |
| 3,141,439 A | * | 7/1964 | Liston ...................... | 440/47 |
| 3,183,838 A | * | 5/1965 | Englesson ................. | 415/60 |
| 4,403,911 A | * | 9/1983 | Possell .................... | 415/90 |
| 4,738,584 A | * | 4/1988 | Price ....................... | 415/60 |
| 4,964,783 A | * | 10/1990 | Haverkamp .............. | 415/52.1 |
| 5,118,251 A | * | 6/1992 | Saulgeot .................. | 415/90 |
| 5,174,726 A | * | 12/1992 | Findlay .................... | 415/90 |
| 5,387,141 A | * | 2/1995 | Toyohara et al. .......... | 440/41 |
| 2003/0036319 A1 | * | 2/2003 | Burg ........................ | 440/38 |

FOREIGN PATENT DOCUMENTS

WO    WO 00/06907 A1  *  2/2000

* cited by examiner

*Primary Examiner*—Christopher Verdier
(74) *Attorney, Agent, or Firm*—David P. Owen; Howrey LLP

(57) ABSTRACT

A pump or turbine is disclosed which includes a housing provided with at least one chamber, a rotor, which is rotatably mounted on a shaft in the chamber, an inlet, which communicates with the chamber at least at the location of the shaft, and an outlet channel, which communicates with the chamber at least at the periphery of the rotor. The pump or turbine moreover comprises at least one bypass channel, a first end of which opens into the outlet channel of the pump and a second end of which forms an inlet. The bypass channel may be used for increasing the propelling force or for pumping slurries, for example.

15 Claims, 5 Drawing Sheets

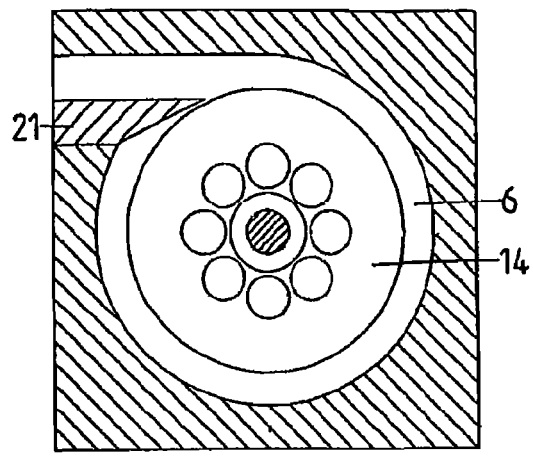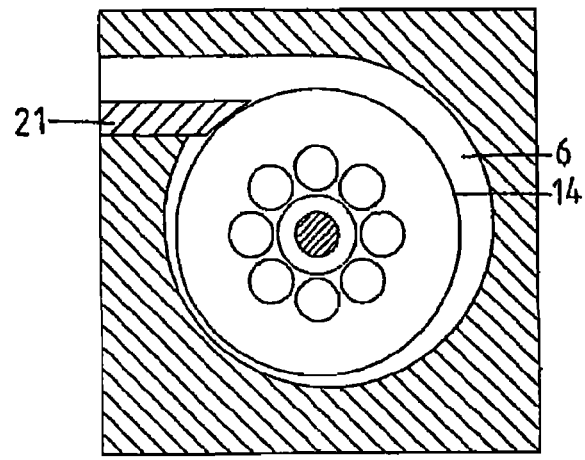
Fig.2　　　　　　　　　　　　　　　　Fig.3
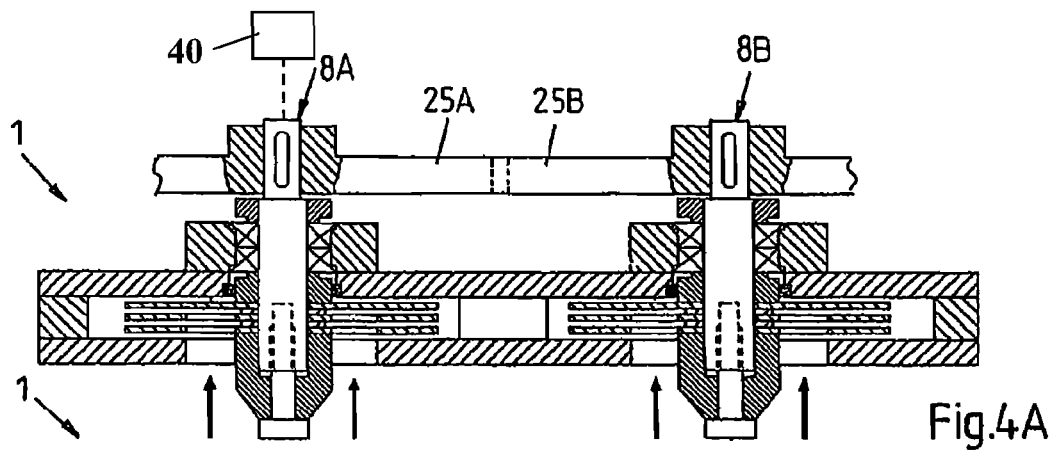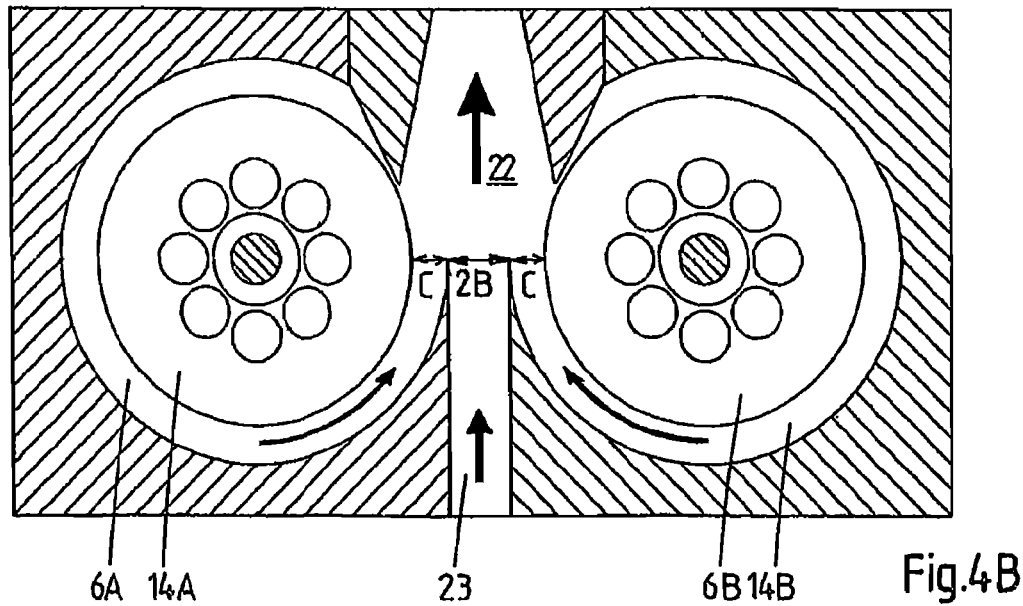
Fig.4A
Fig.4B

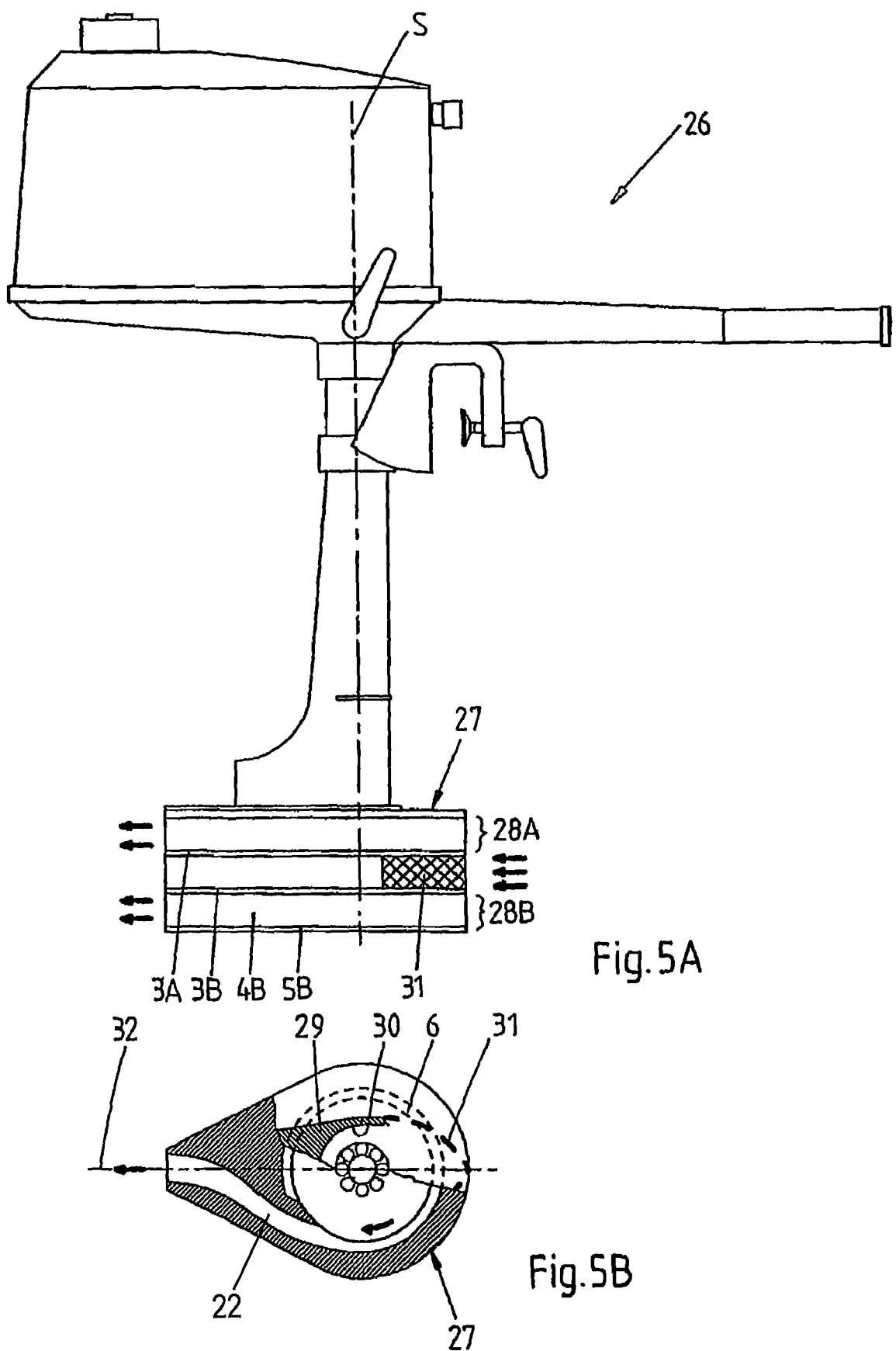

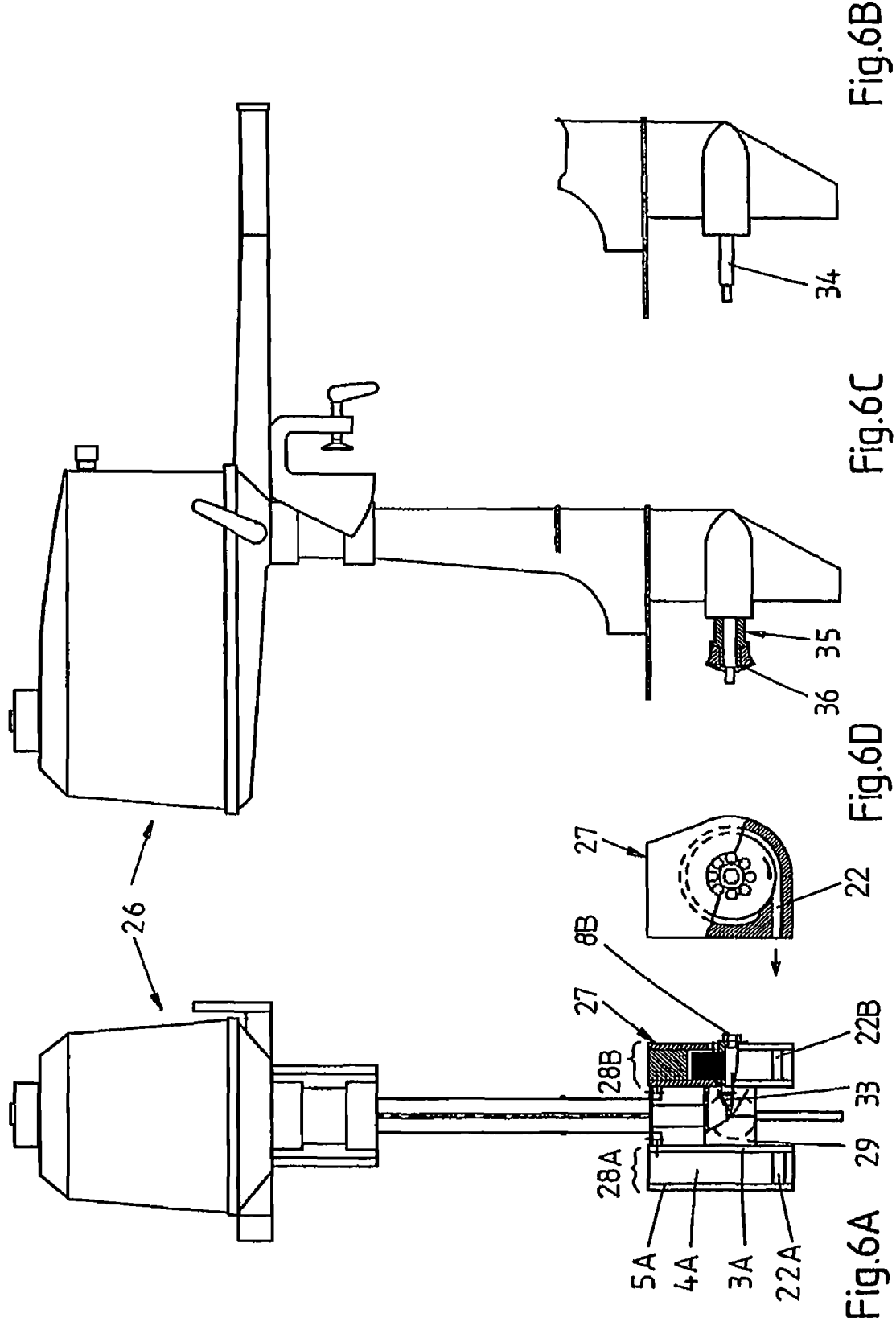

PUMP OR TURBINE DRIVE UNIT COMPRISING SUCH A PUMP OR TURBINE AND OUTBOARD MOTOR

CROSS-REFERENCE TO RELATED APPLICATIONS

This application is a continuation application of PCT/NL2004/000140 filed Feb. 25, 2004, which claims priority to Netherlands application no. 1022785 filed Feb. 26, 2003.

BACKGROUND

1. Technical Field

A pump or turbine is disclosed which comprises a housing provided with at least one chamber, a rotor, which is rotatably mounted on a shaft in the chamber, an inlet, which communicates with the chamber at least at the location of the shaft, and an outlet channel, which communicates with the chamber at least at the periphery of the rotor.

2. Description of the Related Art

Such a pump is known, e.g. from U.S. Pat. No. 1,061,142 in the name of Nikola Tesla. Said patent describes a device by means of which energy can be supplied to a fluid, viz. a so-called Tesla pump, or be withdrawn therefrom (a turbine). An embodiment illustrated in the figures of said patent comprises a volute casing (indicated at 8 in the figures), in which a plurality of flat discs (1) are keyed to a shaft (2). When the shaft is rotated, a fluid present between the discs is drawn in axially as a result of the viscosity and the adhesion between the fluid and the discs, and accelerated tangentially and radially, i.e. along a spiral path, in a direction away from the shaft, after which the fluid exits the casing through an outlet (11).

U.S. Pat. No. 4,218,176 describes a Tesla pump having an outlet which, in order to improve the efficiency, comprises at least one "pitot-like flow path", shown as two L-shaped tubes in the examples, whose cross-sectional area does not exceed about 60 percent of the area of the peripheral zone between the side walls of the pump housing and the height of said path.

U.S. Pat. No. 3,107,848 describes the use of a Tesla pump for the propulsion of a vessel.

SUMMARY OF THE DISCLOSURE

An improved pump and turbine are disclosed herein.

The disclosed pump and turbine are characterized by at least one bypass channel, a first end of which opens into the outlet channel of the pump and a second end of which forms an inlet.

The bypass channel can be used advantageously in various ways. Thus it has been found that the use of the bypass channel enables a considerable increase of the propelling force of a pump, using the same dimensions. In addition to that, the bypass channel can be used for pumping material that is easily damaged, such as water with live fish present therein, or material that may cause damage to or lead to wear on the pump, such as sand-containing slurries.

Preferably, the cross-sectional area of the bypass channel, at least at the location of the outlet channel, is equal to or smaller than the area that is locally defined by the internal wall of the chamber and an imaginary line transversely to (i.e. in axial direction) the periphery of the rotor. Thus the flow from the chamber is powerful enough to ensure a substantial flow through the bypass channel.

Furthermore, the rotor preferably comprises two or more parallel or substantially parallel discs, which are mounted on a shaft and which are provided with one or more openings arranged round said shaft. Such pumps have a high efficiency and allow a relatively large flow through the chamber, and thus a large flow through the bypass channel, in comparison with other centrifugal pumps. In addition to that, cavitation does not occur in these pumps, at least not to the same extent, so that high speeds are possible. Pumps having a relatively small diameter between 2.5 and 15 cm were successfully driven at speeds exceeding 100,000 and 25,000 revolutions per minute, respectively.

If the disclosed pump or a similarly constructed turbine comprises a chamber which is circularly cylindrical over more than 75% of its periphery, and which communicates directly with the environment, i.e. without pitot tubes or the like being used, the production of the pump or turbine will be significantly simplified. Thus, the part of the pump housing that surrounds the periphery of the rotor may comprise a segment of a tube.

Preferably, the housing of the pump or turbine is provided with an insert at the outlet or the inlet, by means of which insert the spacing between the housing and the rotor at said outlet or inlet is defined. The use of said insert makes it possible to adapt the housing to the radius and/or the position of the rotor. If it is desirable to use an eccentrically positioned rotor, e.g. in order to approximate the known spiral-shaped chamber as much as possible with a circularly cylindrical chamber, an insert extending deeper into the chamber may be selected, as will be explained in more detail hereinafter.

A drive unit is also disclosed, such as an outboard motor for a vessel, which is fitted with a pump as described above. Such a drive unit is capable of providing a larger propelling force than the drive unit as shown and described in U.S. Pat. No. 3,017,848 while using the same dimensions.

The disclosed drive unit may be embodied as a module which is configured such that said module can replace the propeller of an outboard motor for a vessel. To that end, the module preferably comprises a shaft which, after the propeller has been removed, can be coupled to the drive shaft for the propeller of the type of outboard motor for which the module is intended. Preferably, means are furthermore provided by which the module can be connected to the lower part of said outboard motor. Preferably, in order to prevent the module generating a moment about the steering axis of the outboard motor, an imaginary axial line through the outlet channel of the module intersects the steering axis, or the module comprises at least two outlet channels on either side of said steering axis, spaced therefrom by the same distance.

From the above it will be apparent that the disclosed pump is also suitable for use with gases. Therefore, within the framework of this disclosure, the term "pump" is understood to comprise compressors as well.

BRIEF DESCRIPTION OF THE DRAWINGS

The disclosed embodiments will now be explained in greater detail with reference to the following figures, wherein:

FIGS. 2 and 3 show two further embodiments.

FIGS. 4A and 4B are a cross-sectional view and a longitudinal sectional view, respectively, of yet another embodiment.

FIGS. 5A and 5B are a side elevation and a sectional view, respectively, of a disclosed outboard motor.

FIGS. 6A-6D show, respectively, a rear view of an outboard motor fitted with the disclosed module and three steps for fitting said module.

DETAILED DESCRIPTION OF THE PRESENTLY PREFERRED EMBODIMENTS

Identical parts and parts having the same or substantially the same function are indicated by the same numerals.

Figure 1A:
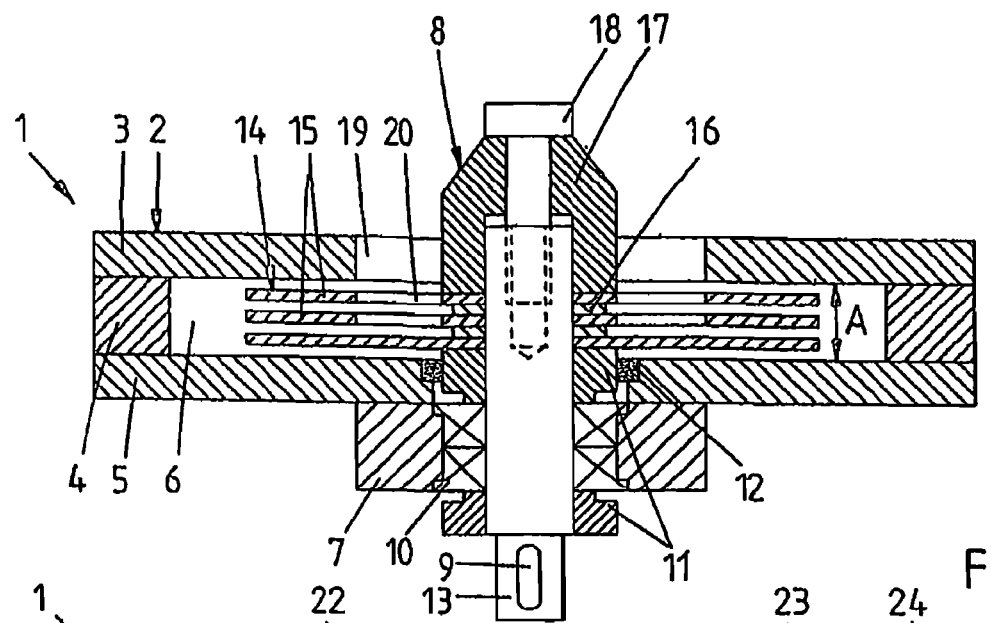
FIGS. 1A and 1B are a cross-sectional view and a longitudinal sectional view, respectively, of a first embodiment.
Figure 1B:
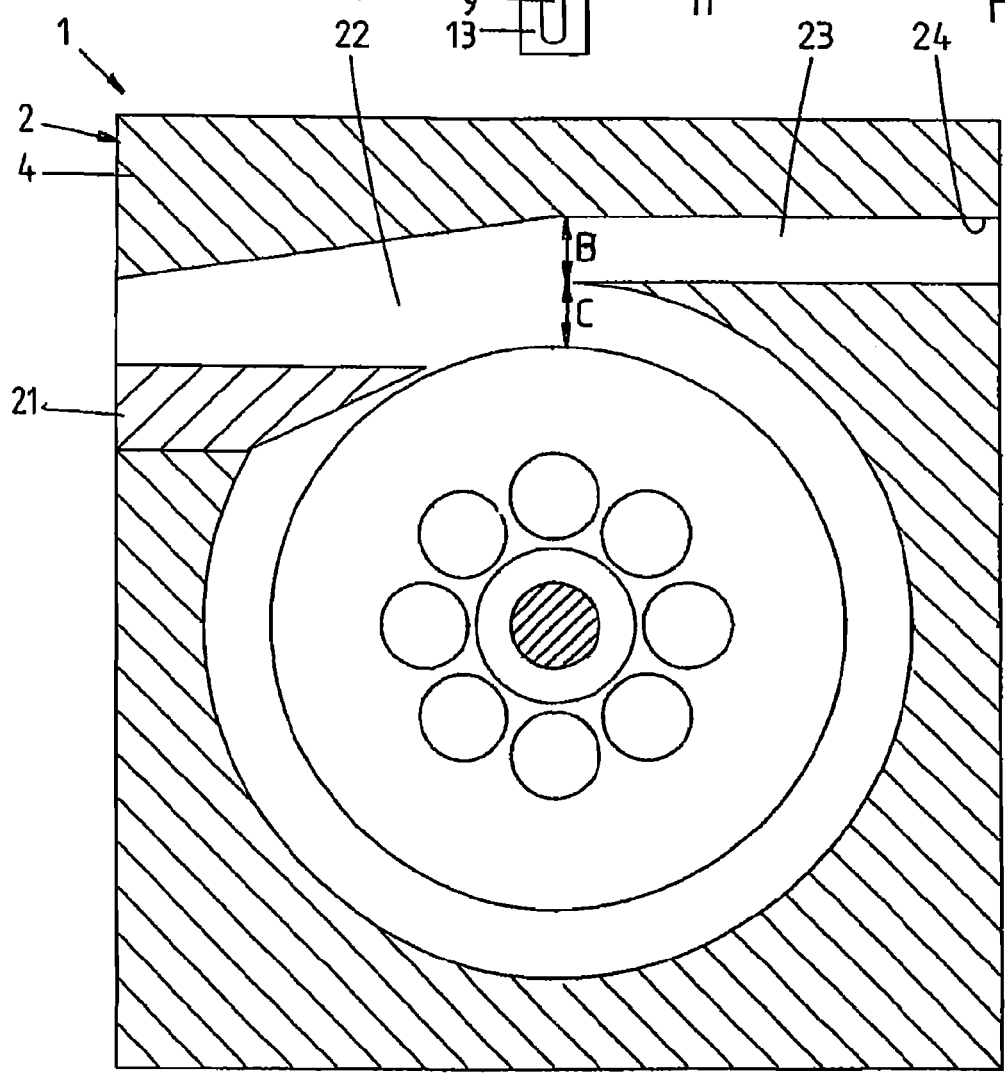

FIGS. 1A and 1B show a cross-sectional view and a longitudinal sectional view, respectively, of a disclosed pump 1. Said pump 1 comprises a housing 2 consisting of three parts, viz, a front plate 3, an intermediate plate 4 and a rear plate 5, e.g. made of steel or of a plastic, which are pressed together by means of bolts (not shown). The intermediate plate 4 is provided with a circularly cylindrical recess, which, together with the front plate 3 and the rear plate 5, defines a chamber 6. The rear plate 5 comprises a bearing housing 7, in which a composite shaft 8 provided with a keyway 9, by means of which said shaft 8 can be connected to a drive unit, such as an electric motor, is rotatably accommodated by means of two bearings 10, e.g. double-seal ball bearings. The bearings 10 are clamped between two internally threaded rings 11, the inner ring 11 of which is sealed by a ring-shaped gasket 12.

Mounted on the central portion 13 of the shaft 8 is a rotor 14, in this case consisting of three flat, round discs 15, e.g. made of steel, stainless steel or a plastic, such as PVC or polycarbonate. The discs 15 are separated from each other by means of ring-shaped spacers 16, and they are pressed against the inner ring 11 by means of a clamping piece 17, which is mounted over the central portion 13 of the shaft 8 by means of a bolt 18. The discs 15 and the chamber 6 together form a so-called Tesla pump. For details on the design and the operation of Tesla pumps, reference is made to U.S. Pat. No. 1,061,142. The larger the surface area and/or the number of discs, the larger the delivery and the propelling force of said pump will be.

The front plate 3 comprises a circular opening which fits over the clamping piece 17, forming an annular, axial inlet 19 therewith. As FIG. 1B shows, the discs 15 are provided with a number of holes 20, e.g. eight holes, whose centres are spaced out evenly on an imaginary circle (indicated by a dotted line), concentrically with the shaft 8, and whose diameter is about the same as the width of the annular inlet 19. A wedge-shaped insert 21 is furthermore mounted in the housing 2, which insert forms an outlet channel 22 together with the front plate 3, the intermediate plate 4 and the rear plate 5.

The pump is preferably provided with a substantially tangential bypass channel 23, a first end of which opens into the outlet channel 22 of the pump 1, and a second end of which forms an inlet 24. The bypass channel 23 is formed in the intermediate plate 4 and has the same width A as the chamber 6. In order to ensure that the flow from the chamber is powerful enough to generate a significant flow through the bypass channel 23, the height B of said channel 23 at the outlet channel 22 is equal to or smaller than the distance C between an imaginary line transversely to the periphery of the rotor 14 and the internal wall of the chamber 6, likewise at the outlet channel 22.

Figure 1C:
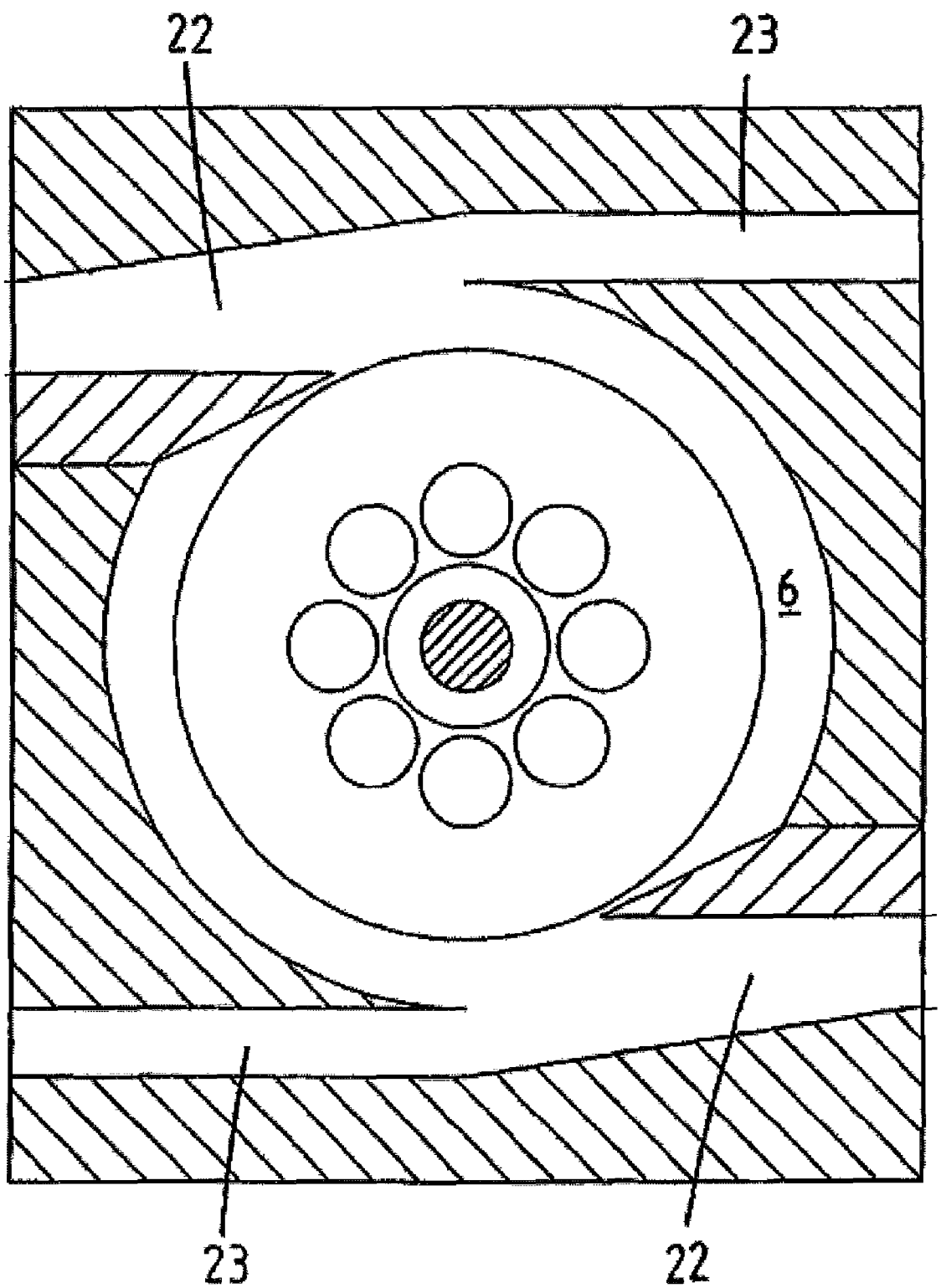
FIG. 1C shows another embodiment.

FIG. 1C shows a pump comprising two outlet channels 22, each provided with a bypass channel 23, which are positioned point-symmetrically relative to each other in this embodiment. The use of more than one outlet channel leads to a reduction of the distance that the fluid must travel through the chamber 6 and to an enhanced efficiency of the pump. The outflow openings of the outlet channels 22 are interconnected to form a common outlet. This can be achieved by means of a manifold, for example, which comprises a number of pipes corresponding to the number of outlet channels, which pipes are each connected to an outlet channel and which are inclined towards each other, possibly being intertwined into a coil, and which pipes terminate at or near a common point or which open into a common pipe, e.g. a pipe which is in line with the shaft 8 of the pump. These configurations inter alia prevent the generation of a moment or at least reduce the extent to which this takes place.

In the specific example of FIGS. 1A and 1B, the chamber 6 is circularly cylindrical over about 80% of the periphery thereof, i.e. it is not spiral-shaped, as is for example the case with the pump according to U.S. Pat. No. 1,061,142, which considerably simplifies the manufacture thereof. In the Tesla pump according to FIG. 2, the rotor 14 is positioned concentrically in the circularly cylindrical chamber 6, and the tip or apex angle of the insert 21 is relatively acute. Consequently, higher outflow rates can usually be achieved with the pump according to FIG. 2, whilst the pump according to FIG. 3 enables a higher pressure or a greater lift.

FIGS. 4A and 4B are a cross-sectional view and a longitudinal sectional view, respectively, of a preferred embodiment of the pump 1, which comprises two chambers 6A, 6B and two rotors 14A, 14B. The chambers 6A, 6B communicate with a common outlet channel 22, which is in line with a single bypass channel 23. The pump 1 is connected to a common drive unit 40 which in this example engages one of the shafts 8A and which is coupled to the other shaft 8B, e.g. by means of two gears 25A and 25B, so that the rotors 14A and 14B can be driven in opposite directions.

In this embodiment, too, the cross-sectional area A×2B of the bypass channel 23, at least at the outlet channel 22, is preferably equal to or smaller than the total area A×2C that is locally defined by the respective internal walls of the chambers 6A, 6B and an imaginary line transversely to the periphery of each of the rotors 14A, 14B.

The bypass channels as described can be used advantageously in various ways. Thus it has been found that the use of the bypass channel makes it possible to achieve a significant increase of the propelling force of a pump while using the same dimensions. This makes the pump very suitable for propelling a vessel, for example.

In addition to that, the bypass channel may be used for pumping material that is easily damaged, such as a live fish that is to be moved across a dam, or of material which may cause damage to the pump or lead to wear on the pump, such as sand-containing slurries, e.g. dredgings. In the case of the latter two applications, it may be necessary to use very large pump dimensions, e.g. a chamber having a diameter of 3 m.

FIGS. 5A-6D show two examples of a drive unit for a vessel.

FIGS. 5A and 5B are a side elevation and a sectional view, respectively, of a commercially available outboard motor 26, wherein the propeller, the propeller housing and the reduction gear, which reduced the propeller speed to half the motor speed, have been exchanged for a module 27.

Said module 27 comprises two horizontal, in use, pump housings 28A, 28B positioned one above another, each pump housing being defined by an assembly consisting of a relatively thick plate 4A, 4B respectively, each being provided with a chamber 6, and two relatively thin plates 3A, 5A and 3B, 5B respectively, which cover the upper side and the bottom side of the thick plate 4A, 4B. The pump housings 28A, 28B are separated from each other by an inlet housing or inlet plate 29. Said plate 29 comprises a semicircular recess 30, which functions as an inlet for the module 27 and which is screened by a mesh 31 on the front side, which prevents particles that are too large from entering the module 27. The semicircular recess 30 communicates with the chambers 6 in the pump housings 28A, 28B via openings in the thin plates 3A, 3B adjacent to the inlet housing 29. Furthermore, the pump housings 28A, 28B each comprise an outlet channel 22A, 22B respectively, which opens into an outlet opening whose axial line 32 intersects the steering axis S of the motor 26. Since the present pump is relatively insensitive to cavitation, it was possible to remove the reduction gear of the original outboard motor, so that the speed of the rotors 14 corresponds to the motor speed.

FIGS. 6A-6D show, respectively, a rear view of an outboard motor fitted with the module 27 and three steps for exchanging only the propeller of a commercially available outboard motor 26 for a module 27. In this embodiment, the module 27 comprises two vertical, in use, pump housings 28A, 28B arranged beside each other, each pump housing being defined by an assembly consisting of a relatively thick plate 4, which is provided with a chamber 6, and two relatively thin plates 3, 5, which cover the sides of the thick plate 4. The pump housings 28A, 28B are separated from each other by an open inlet housing 29, in which the inlet openings and the ends of the shafts 8 of the pump housings 28A, 28B terminate. Said ends are each provided with a conical gear 33. The outlet channels 22 are present on either side of the steering axis S of the motor 26 and are equally spaced therefrom.

FIGS. 6A-6C successively show how the propeller was removed from the drive shaft 34 of the outboard motor 26 and an adapter 35 was mounted on said shaft. Said adapter 35 is provided with a conical gear 36 at the end remote from the outboard motor 26. Said gear 36 has double the amount of teeth of the aforesaid gears 33, so that a transmission is obtained which counteracts the reduction by the reduction gear that is still present in the outboard motor 26. The gears 33, 36 may be adapted to suit any desired transmission ratio, of course, which transmission ratio will in many cases depend on the type of outboard motor and the number and the dimension of the discs in the rotor(s) in the module 27. In order to make room for the aforesaid module 27, a portion of the suction pipe for cooling water of the outboard motors according to FIGS. 5A-6D was removed. This was done in such a manner that the inflow opening of said pipe will be positioned below the water surface in use.

This disclosure is not limited to the embodiments as described above, which of course, can be varied in many ways and still fall within the scope of this disclosure and the accompanying claims. As just one example, the bypass channel may extend three-dimensionally, so that the inlet thereof coincides with the axial inlet of the pump.

What is claimed is:

1. A pump comprising:
   a housing comprising:
   a chamber,
   a rotor which is rotatably mounted on a shaft in the chamber,
   an inlet which communicates with the chamber at the location of the shaft,
   an additional chamber,
   an additional rotor which is rotatably mounted on an additional shaft in the additional chamber,
   a common outlet channel, which communicates with the chamber at the periphery of the rotor and communicates with the additional chamber at the periphery of the additional rotor, and a tangential bypass channel, a first end of which opens into the common outlet channel of the pump and a second end of which forms an inlet.

2. The pump according to claim 1, wherein a cross-sectional area of the tangential bypass channel, at a location of the common outlet channel, is equal to or smaller than the combination of an area that is locally defined by an internal wall of the chamber and an imaginary line transverse to a periphery of the rotor and an area that is locally defined by an internal wall of the additional chamber and an imaginary line transverse to a periphery of the additional rotor.

3. The pump according to claim 1, wherein the rotor and the additional rotor comprises two or more parallel or substantially parallel discs, which are mounted on the respective shaft and which are provided with openings arranged round the respective shaft.

4. The pump according to claim 1, wherein the pump is coupled to a single drive unit, by means of which said rotor and additional rotor can be driven in opposite directions.

5. The pump according to claim 1, wherein the chamber and the additional chamber are cylindrical and are in direct communication with an ambient environment.

6. The pump according to claim 5, wherein the housing is provided with an insert at the common outlet channel for defining a spacing between the housing and the rotor and the additional rotor at said common outlet channel.

7. A drive unit for a vessel comprising a pump according to claim 1.

8. An outboard motor comprising a pump according to claim 1.

9. The outboard motor according to claim 8, wherein the rotor comprises two or more parallel or substantially parallel discs, mounted on the shaft and which comprise openings arranged round said shaft.

10. A turbine comprising:
    a housing comprising a chamber,
    a rotor which is rotatably mounted on a shaft in the chamber,
    an inlet which communicates with the chamber at the location of the shaft, and
    an additional chamber,
    an additional rotor which is rotatably mounted on an additional shaft in the additional chamber,
    a common outlet channel, which communicates with the chamber at the periphery of the rotor and communicates with the additional chamber at the periphery of the additional rotor,
    a tangential bypass channel, a first end of which opens into the common outlet channel of the turbine and a second end of which forms an inlet.

11. The turbine according to claim 10, wherein a cross-sectional area of the tangential bypass channel, at a location of the common outlet channel, is equal to or smaller than the combination of an area that is locally defined by an internal wall of the chamber and an imaginary line transverse to a periphery of the rotor and an area that is locally defined by an internal wall of the additional chamber and an imaginary line transverse to a periphery of the additional rotor.

12. The turbine according to claim 10, wherein the rotor and the additional rotor comprises two or more parallel or substantially parallel discs, which are mounted on the respective shaft and which are provided with openings arranged round the respective shaft.

13. The turbine according to claim 10, wherein the turbine is coupled to a single drive unit, by means of which said rotor and said additional rotor can be driven in opposite directions.

14. The turbine according to claim 10, wherein the chamber and additional chamber are cylindrical and are in direct communication with an ambient environment.

15. The turbine according to claim 14, wherein the housing is provided with an insert at the common outlet channel for defining a spacing between the housing and the rotor and the additional rotor at said common outlet channel.

* * * * *

UNITED STATES PATENT AND TRADEMARK OFFICE
CERTIFICATE OF CORRECTION

PATENT NO. : 7,632,061 B2   Page 1 of 1
APPLICATION NO. : 11/212193
DATED : December 15, 2009
INVENTOR(S) : Neeb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Second Day of November, 2010

David J. Kappos
*Director of the United States Patent and Trademark Office*